US009527654B2

(12) United States Patent
Jethwani (10) Patent No.: US 9,527,654 B2
(45) Date of Patent: Dec. 27, 2016

(54) JELLY DISPENSER AND RELATED METHOD

(71) Applicant: Ranjeev Jethwani, London (GB)

(72) Inventor: Ranjeev Jethwani, London (GB)

(*) Notice: Subject to any disclaimer, the term of this patent is extended or adjusted under 35 U.S.C. 154(b) by 0 days.

(21) Appl. No.: 14/553,855

(22) Filed: Nov. 25, 2014

(65) Prior Publication Data

US 2015/0151896 A1 Jun. 4, 2015

(30) Foreign Application Priority Data

Nov. 29, 2013 (GB) .................................... 1321065.3

(51) Int. Cl.
| | |
|---|---|
| B67D 7/60 | (2010.01) |
| G01F 11/00 | (2006.01) |
| B65D 83/00 | (2006.01) |
| B65D 47/06 | (2006.01) |
| A47G 19/18 | (2006.01) |
| A23L 1/06 | (2006.01) |

(52) U.S. Cl.
CPC ............ B65D 83/0027 (2013.01); A23L 1/06 (2013.01); A23L 21/10 (2016.08); A47G 19/183 (2013.01); B65D 47/06 (2013.01); B65D 83/0011 (2013.01); *A23V 2002/00* (2013.01)

(58) Field of Classification Search
CPC . B65D 83/0027; B65D 47/06; B65D 83/0011; A23L 21/10; A23L 1/06; A47G 19/183; A23V 2002/00
USPC ......................................................... 222/390
See application file for complete search history.

(56) References Cited

U.S. PATENT DOCUMENTS

| | | | | |
|---|---|---|---|---|
| 1,025,512 | A | * | 5/1912 | Craven .......................... 222/390 |
| 4,074,833 | A | | 2/1978 | Otto, Sr. |
| 4,491,245 | A | * | 1/1985 | Jamison ........................ 222/107 |
| 6,688,501 | B2 | * | 2/2004 | DeGroot et al. .............. 222/556 |
| 8,418,891 | B1 | | 4/2013 | Harris |
| 2008/0179345 | A1 | * | 7/2008 | Patey ..................... A47G 19/24 222/129 |
| 2008/0247805 | A1 | * | 10/2008 | deVirag et al. ............... 401/139 |
| 2013/0119091 | A1 | * | 5/2013 | Bowers, Jr. .................... 222/386 |
| 2013/0273211 | A1 | * | 10/2013 | Virgallito et al. ............. 426/103 |

FOREIGN PATENT DOCUMENTS

| | | |
|---|---|---|
| GB | 2 061 101 A | 5/1981 |
| WO | WO 03/057581 A1 | 7/2003 |

OTHER PUBLICATIONS

Combined Search and Examination Report under Sections 17 and 18(3) for Application No. GB1321065.3, mailed on Jan. 17, 2014, 6 pages.

* cited by examiner

*Primary Examiner* — Patrick M Buechner
*Assistant Examiner* — Benjamin R Shaw
(74) *Attorney, Agent, or Firm* — HIPLegal LLP; Judith A. Szepesi (57) ABSTRACT

A jelly dispenser comprises a generally cylindrical body part including a set jelly and having a thread and having at one end a channel for dispensing the set jelly to a user and at the other end an opening for receiving a dispensing member, wherein the channel is tapered and/or includes one or more bends and wherein the dispensing member has a thread that mates with the thread of the body part so as to cause the movement of the dispensing member helically within the body part as the dispensing member is rotated relative to the body part, thereby to provide the dispensing of the jelly through the channel.

18 Claims, 7 Drawing Sheets

JELLY DISPENSER AND RELATED METHOD

RELATED APPLICATION

The present application claims priority to United Kingdom Patent Application No. 1321065.3, filed on Nov. 29, 2013, which is incorporated herein by reference in its entirety.

FIELD

The present invention relates to a dispenser and in particular to a dispenser for containing and dispensing jelly.

BACKGROUND

It is well known to use gelatin to make foodstuffs that are known variously around the world as jelly, jello and gelatin desserts (hereafter jelly). The making of a jelly typically involves the addition of gelatin to a heated liquid (e.g. water or a fruit juice) and the subsequent cooling of the mixture, for instance in a refrigerator. Upon cooling, the mixture sets to form the jelly, which is a solid. Jellies can be flavored and cultured, and are widely eaten by children and adults alike. Jellies may be made with a wide range of ingredients. Jellies are typically consumed from a bowl or pot using a spoon. A fruit preserve that is set with pectin is not a jelly in this context. It is known also to make jellies using alcoholic drinks, typically distilled spirits (known as liquor in some parts of the world) such as vodka, tequila, gin etc. A jelly made from gelatin is a solid and does not flow, even though it typically has a very high water content. Agar is similar to gelatin but is suitable for vegetarians and vegans.

BRIEF DESCRIPTION OF THE FIGURES

Embodiments of the present invention will now be described, by way of example only, with reference to the accompanying drawings in which.

DETAILED DESCRIPTION

One embodiment of the present invention provides a method comprising including liquid jelly mixture in a generally cylindrical body part of a dispenser comprising the generally cylindrical body part and a dispensing member, and refrigerating the liquid jelly mixture in the generally cylindrical body part such that the jelly mixture sets. The dispenser may also be referred to as a drinking vessel.

In one embodiment, the generally cylindrical body part has a thread and has at one end a channel for dispensing the set jelly mixture to a user and at the other end an opening for receiving the dispensing member. The dispensing member has a thread that mates with the thread of the body part so as to cause movement of the dispensing member helically within the body part as the dispensing member is rotated relative to the body part, to provide the dispensing of the set jelly through the channel. In one embodiment, the channel is tapered and/or includes one or more bends.

One embodiment of the jelly dispenser provides a dispenser comprising a generally cylindrical body part including a set jelly and having a thread and having at one end a channel for dispensing the set jelly to a user and at the other end an opening for receiving a dispensing member. In one embodiment, the channel is tapered and/or includes one or more bends and the dispensing member has a thread that mates with the thread of the body part so as to cause the movement of the dispensing member helically within the body part as the dispensing member is rotated relative to the body part, to provide the dispensing of the jelly through the channel.

In one embodiment, the channel may be tapered and/or includes one or more bends. This can provide mastication of jelly as it is dispensed.

The dispensing member may have a face that extends across the longitudinal axis of the body part in use and is configured to exert an expelling force against the jelly, gel or paste as the dispensing member moves helically within the body part. The face of the dispensing member may be substantially planar. Alternatively, the face of the dispensing member may be non-planar. Further alternatively, the face of the dispensing member may have a valley shaped, e.g. V- or U-shaped, cross section.

The dispensing member may include a grip for allowing a user to rotate the dispensing member relative to the body part. The dispensing member may be configured to move helically within the body part by a transducer such as a motor.

The generally cylindrical body part may comprise an outer body and a lid, and the channel may be formed at least in part in the lid. The outer body may include an end member at one end, the end member including an aperture that forms at least part of the channel. Alternatively, the outer body may include an end member at one end, the end member including an aperture; the generally cylindrical body part may comprise an outer body and a lid, and the channel may be formed in part in the lid and in part by the aperture.

The aperture included in the end member may align with an opening of the channel of the lid when the lid is fitted to the outer body.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
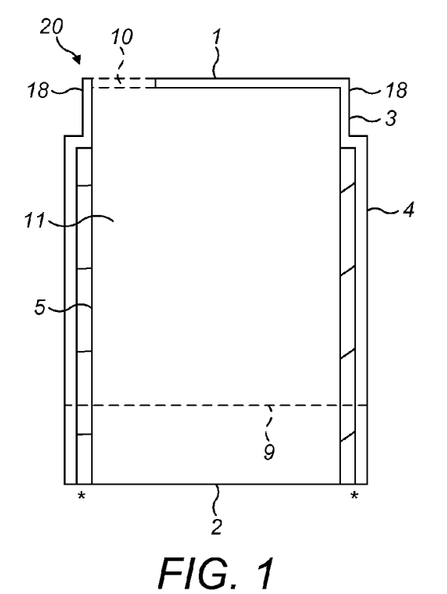
FIG. 1 is a side cross-sectional view of an outer body of a drinking vessel in accordance with one embodiment of the invention.

FIG. 1 shows an outer body 20 of the jelly dispenser, which is of a generally cylindrical form, in one embodiment. In FIG. 1, the outer body 20 is in cross-section with an uppermost end shown at the top of the figure and a lowermost end shown at the bottom of the figure. The outer body 20 includes a tubular part 3 that is generally vertical in the figure. Formed over most or all of the height of the tubular member 3 is a thread bearing section 4. A thread 5 is formed on the innermost surface of the thread bearing section 4 of the outer body 20. The thread bearing section 4 extends from the bottom end of the outer body 20 to the top or almost the top of the tubular member 3.

Figure 3:
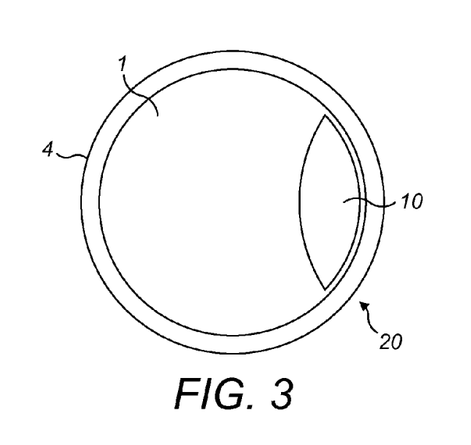
FIG. 3 is a plan view of the outer body of the drinking vessel in accordance with one embodiment of the invention.

The lowermost end of the outer body 20 is open. At the top end of the outer body 20 is provided an end member 1, which is visible in both FIGS. 1 and 3. The end member here is planar and extends substantially perpendicularly to the tubular member 3. An aperture 10 is formed in the end member 1. As can be seen best in FIG. 3, the aperture 10 is located adjacent one side of the area that is formed by the end member 1. The aperture 10 in this example is eye- or almond-shaped.

Figure 2:
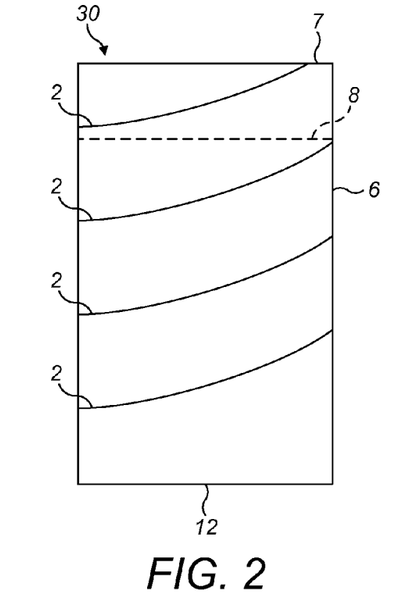
FIG. 2 is a side view of an inner body of the drinking vessel in accordance with one embodiment of the invention.

The inner body 30 is shown in FIG. 2. The inner body 30 has a generally cylindrical shape. The inner body has a top end wall 7 and a bottom end wall 12. The top end wall forms a piston face, as is described below.

A main wall 6 of the outer body 30 is substantially cylindrical in shape. A thread 2 is formed on the outermost surface of the wall 6. The thread 2 on the outermost surface of the inner body 30 corresponds to the thread 5 on the innermost surface of the outer body 20. The outer diameter of the wall 6 of the inner body 30 and the inner diameter of the thread bearing section 4 of the outer body 20 are selected such that the fit of the threads 5, 2 is reasonably tight but can easily be operated by a user.

In brief, the inner body 30 is able to be moved axially within the outer body 20 by rotation of the inner body 30 relative to the outer body 20 such that axial movement occurs by virtue of the interacting threads 2, 5. The effect of this is explained in more detail below.

Figure 4A:
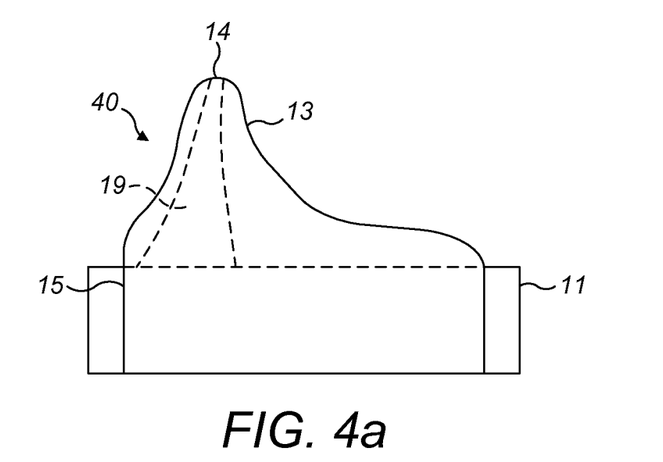
FIG. 4a is a side view of a first option for a lid of the drinking vessel in accordance with one embodiment of the invention.
Figure 4B:
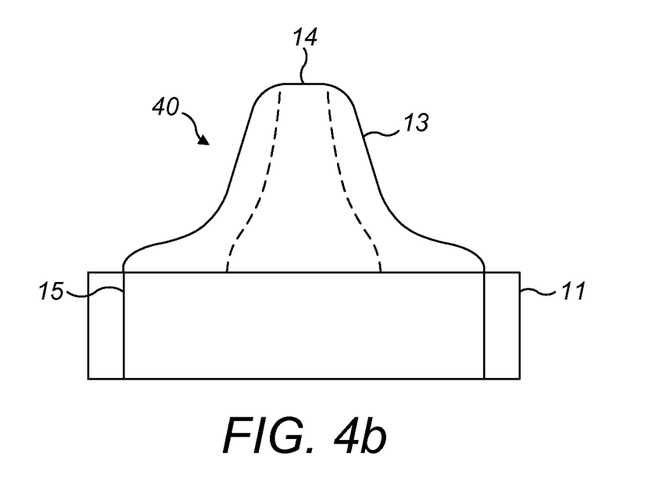
FIG. 4b is a front view of the lid in accordance with one embodiment of the invention.

The outer body 20 defines a volume 11 into which liquids can be supplied. FIGS. 4a and 4b show a lid 40 that is able to be provided on the outer body 20.

The lid 40 includes a tubular part 11 that is dimensioned so as to allow the lid 40 to be fitted over the top end of the outer body 20. The tubular part 11 is provided on its innermost surface with a thread 15, which fits with a thread 18 that is provided on the outermost surface of the uppermost part of the tubular member 3 of the outer body 20. This allows the lid 40 to be screwed onto the outer body 20. Moreover, once the lid 40 has been screwed into place on the outer body 20 with a reasonable amount of torque, it is held in place by a friction fit and a corresponding amount of torque in the opposite direction is required in order to unscrew the lid 40 from the outer body 20.

When the lid 40 has been screwed into place on the outer body 20, the aperture 10 in the end member 1 of the outer body 20 is aligned with a lowermost end of a channel 19 that is formed within the main body of the lid 40. The channel 19 extends from the lowermost end, which is adjacent to the aperture 10 in the end member 1, to an aperture 14 in a spout 13 at its uppermost end. This is best visible in FIGS. 4a and 4b. The cross-sectional area of the aperture of the channel 19 at the aperture 14 of the spout 13 is less than the cross-sectional area of the channel 19 at its lowermost end, which is closest to the aperture 10 in the outer body 20. The difference in cross-sectional area between the top and the bottom of the channel 19 may be in the order of two to five times, i.e. the cross-sectional area of the bottom of the channel 19 may be between two and five times the cross-sectional area of the channel at the aperture 14. The difference in the area dictates the difference in speed of ejection of fluids from the aperture 14 from the spout and the speed of fluids exiting the aperture 10 of the outer body 20.

Figure 5:
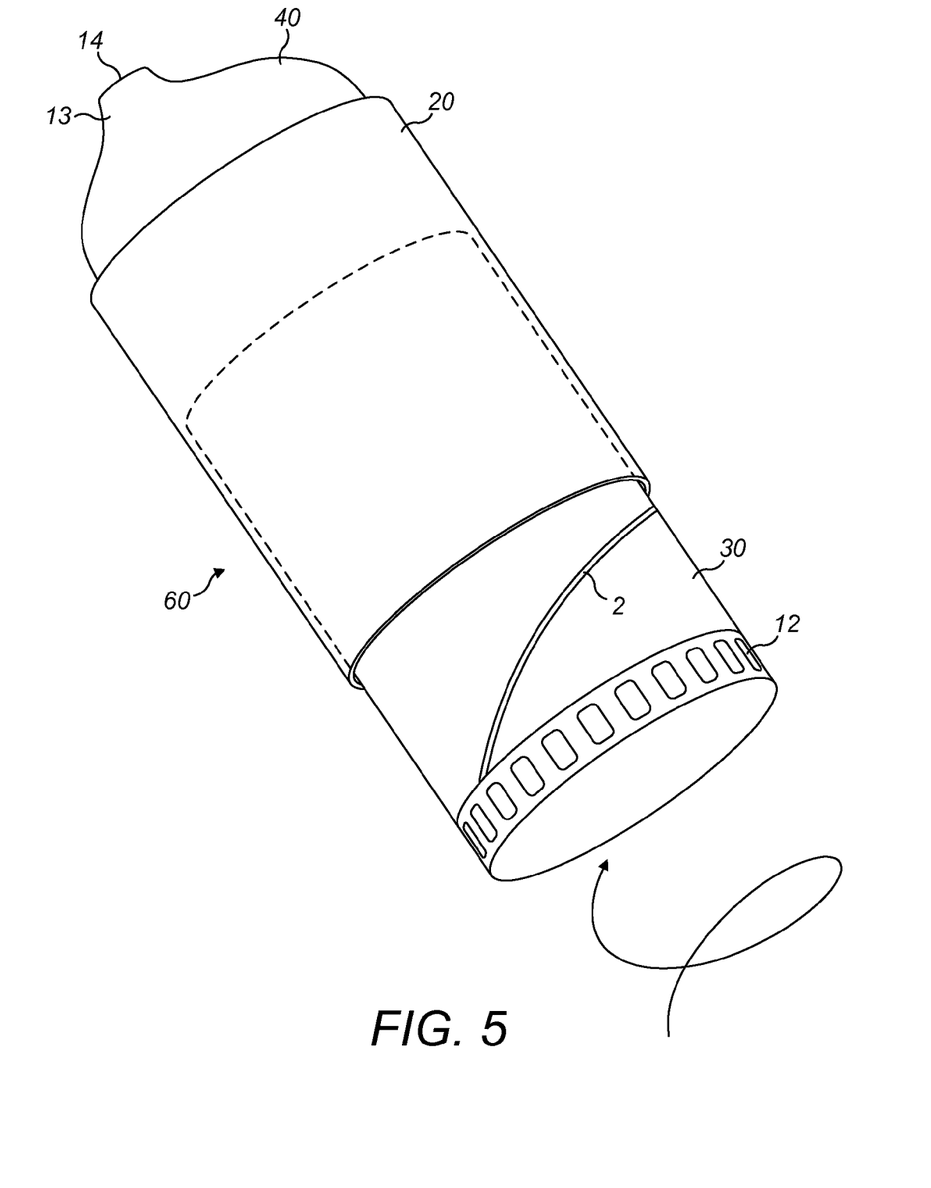
FIG. 5 is a perspective view of the drinking vessel with the outer body, inner body and lid connected together in accordance with one embodiment of the invention.

As can be seen in FIG. 5, the lowermost end 12 of the inner body 30 may be provided with a gnarled outer surface, so as to allow it easily to be gripped by a user in use.

The dimensions of the dispenser, or drinking vessel, may be chosen so as to provide any required volume of jelly. For instance, providing the outer body 20 with an internal diameter of 5 cm and a height of 6.1 cm provides a volume of approximately 4 US fluid ounces of content, or 120 ml. This may be suitable for a jelly beverage for a child. An adult may prefer a drinking vessel with a capacity of 180 ml or 240 ml.

The use of the drinking vessel for containing and dispensing jelly will now be described.

Figure 8:
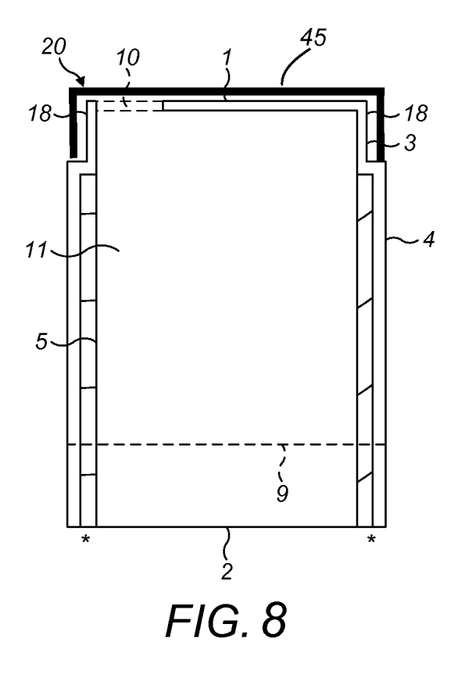
FIG. 8 is a side view of the drinking vessel of FIG. 1, including a temporary lid.

The drinking vessel is filled with jelly firstly by separating the inner and outer bodies 20, 30 and removing the lid 40, if the components were not already separated. Then, a temporary lid 45 is placed over the end of the outer body 20 that is uppermost in FIG. 1, as shown in FIG. 8. The outer body 20 and lid are then inverted, such that the lid and aperture 10 are at the bottom. When the outer body 20 has been placed on the flat surface, it provides an aperture at its uppermost end that has a diameter equal to the diameter of the outer body 20. Because of the temporary lid, the lowermost end of the outer body 20 is closed when the outer body 20 is in this position.

A jelly mixture is created by mixing gelatin with hot water or juice and whatever flavorings and colorings and other ingredients are required to be included in the jelly. The mixture is then poured into the outer body 20, which contains the liquid. The liquid may be included into the outer body 20 up to a level indicated by the dashed line 9 in FIG. 1. Either way, the mixture is not provided all the way to the top, and a gap remains between the top level of the liquid and the uppermost end of the outer body 20.

The outer body 20 and the liquid in the volume 11 is then refrigerated, either by refrigerating the volume in which the outer body 20 is located at the time the jelly mixture was poured into the volume 11 or else by moving the outer body 20 and temporary lid into a refrigerated volume (such as is provided by a domestic or commercial refrigerator). After some time, typically 3-4 hours, the gelatin in the jelly mixture causes the mixture to set into a solid form of jelly.

Once the jelly has set, the outer body 20 can be removed from the refrigerated volume.

Although in the above the aperture 10 is closed using a temporary lid placed over the end of the outer body 20 that is uppermost in FIG. 1, the aperture may be closed in some other way. For instance, the outer body 20 may be placed upside down onto a flat surface which is either located within a refrigerable volume or can be carried into and placed into a refrigerated volume. Because the end member 1 has a flat surface, the aperture 10 is closed when the outer body 20 is placed onto the flat surface. When the outer body 20 has been placed on the flat surface, it provides the aperture at its uppermost end that has a diameter equal to the diameter of the outer body 20. Because of the placement of the end member 1 against the flat surface on which the outer body 20 has been placed, the lowermost end of the outer body 20 is closed.

After it has set, the jelly in the volume 11 is in solid form so does not flow through the aperture 10. Additionally, the outer body 20 can be inverted such that the aperture 10 is at the top and the open end is at the bottom. In this condition, also, the jelly in the volume 11 does not fall through the bottom end of the outer body 20 because of its solid form. The jelly is held in place in part due to friction with the outer body 20 and in part because of the presence of the threads, which provide a barrier to movement of the jelly along the outer body 20.

In order to provide the drinking vessel ready for use, a user inserts the uppermost end of the inner body 30 into the opening at the lowermost end of the outer body 20 and rotates the two relative to one another such that the threads 2, 5 engage and cause the inner body 30 to extend axially into the outer body 20, in a helical movement. Once the end of the inner body 30 contacts the surface of the jelly in the volume 11, the user stops rotating the inner body 30 relative to the outer body 20.

The dotted line shown at 8 in FIG. 2 shows the amount of the inner body 30 that is extended into the outer body 20 when the outer body 20 is provided with jelly in the volume 11 and prior to the jelly being expelled by action of the user.

Prior to the end of the inner body 30 contacting the surface of the jelly in the volume 11, air that was in the volume between these two surfaces is released between the threads 2, 5. Air can escape between the threads because there is little reaction force between the threads of the inner body 30 and the threads of outer body 20 at this stage.

The lid 40 is applied to the outer body 20 by the user screwing the lid 40 onto the top end of the outer body 20 such that the threads 18, 15 engage with one another. Once the lid 40 has been placed onto the outer body 20, the channel 19 is full of air. Jelly is located in the volume 11 in the outer body 20 up to the location of the aperture 10, but at this stage does not pass into the channel 19.

It will be appreciated that the lid can be provided onto the outer body before the inner body 30 is inserted into the outer body, or the other way around.

At this stage, the drinking vessel is containing jelly and is ready to be used.

The jelly is a solid and thus does not flow in the same way that drinks normally flow. However, bonds in the structure of the jelly can be overcome with relatively little force, allowing the solid jelly to be broken up. The force required to break the bonds in the structure of the jelly cannot be normally overcome by the suction force that a user can apply to the jelly through a drinking straw, for example, so drinking a jelly through a straw is not a viable option. However, such is not necessary with the drinking vessel described above.

In particular, the jelly in the volume 11 can be dispensed through the aperture 14 of the spout 13 for drinking by a user simply by the user further rotating the inner body 30 relative to the outer body 20. In particular, the user may grasp the outer body 20 in one hand and grasp the gnarled portion 12 or some other part of the inner body 30 with the other hand. The user can then apply a force to the jelly in the volume 11 by applying a rotating force to the inner body 30 relative to the outer body 20 such as to cause the inner body 30 to move helically in an axial direction relative to the outer body 20. In this particular example, rotating the inner body 30 in a clockwise direction, looking at the bottom end of the inner body 30, causes the inner body 30 to extend axially into the outer body 20. This movement, and in particular the force that results in the movement, applies a force to the jelly in the volume 11, which is thereby compressed. The compression of the jelly causes some of the structural bonds within the jelly to be broken such that the jelly moves into the channel 19. As the inner body 30 is rotated more, it extends further into the outer body 20 and more jelly is expelled from the volume 11 into the channel 19 of the lid 40. Further structural bonds within the composition of the jelly are broken as the jelly moves along the channel 19, by virtue of the changing cross-sectional area (tapering) of the channel 19. After sufficient rotation of the inner body 20, the jelly from the volume 11 reaches the aperture 14 of the lid 40 and is expelled therefrom.

The spout 13 is shaped such as to fit comfortably into a user's mouth. Thus, a user can place the spout 13 within their mouth and cause the jelly from the volume to be dispensed into their mouth by rotating the inner body 30 relative to the outer body 20.

In embodiments in which the lid 40 is provided with a spout that can be inserted into a user's mouth, the user may form a seal by closing their lips around the spout. This may allow the user to assist expulsion of the jelly from the volume 11 in the outer body 20 by exerting a sucking and/or squeezing (milking) pressure onto the spout, although expulsion may be provided solely by rotation of the outer body 20 relative to the inner body 30.

The jelly that is expelled from the aperture 14 has the same density as the jelly within the volume 11. This is the case because there is no opportunity for air or any other fluid to become mixed with the jelly as it passes from within the outer body 20 to the aperture 14. However, the jelly that reaches the aperture 14 has been subjected to various forces and some bonds within the structure of the jelly have been broken. As such, the jelly is in much less of a solid form when it reaches the aperture 14, and from there can pass into the user's mouth, than it was when it was in the volume 11 within the outer body 20. Although not necessarily a true liquid, the broken jelly that is expelled through the aperture 14 is in a form that can be swallowed easily by the user without requiring any chewing or other breaking up of the structure of the jelly. The jelly is masticated firstly by the action of passing through the aperture 10. The jelly is then further masticated by the action of passing through the tapered channel 19. Thus, the action of expelling the jelly from the outer body 20 through the aperture 10 and the channel 19 and ultimately through the aperture 14 in the lid 40 renders the jelly into a quasi-liquid form whereby it can be consumed by the user in a drinking motion if the user so desires.

Because the aperture 10 is aligned with the channel 19 in use, the aperture 10 and the channel 19 can together be said to form a channel. Both the aperture 10 and the channel 19 provide mastication.

The storage of the jelly within the outer body in a solid form, rather than in a liquid or quasi-liquid form, provides a number of advantages. Particularly, the jelly cannot be spilt, in the sense that a liquid drink can be spilt. As such, the use of the drinking vessel filled with jelly can be particularly advantageous in environments where liquid drinks would potentially be problematic. These include crowded places in which the spilling of liquid drinks can easily occur, especially if this might result in the spoiling of clothes etc. It also includes clean environments, electrical environments etc., where the presence of a liquid could potentially be very hazardous. It also includes zero-gravity environments, such as those found in earth orbit, in which free-floating liquid droplets may potentially do a lot of damage to sensitive equipment.

There are some features of the drinking vessel itself, which contribute to avoiding spillages. These include the screw thread connection between the inner body 30 and the outer body 20. In particular, relative rotation between the inner body 30 and the outer body 20 is required in order to expel the jelly from the volume 11. Such a rotational movement would not normally occur accidentally.

Additionally, the drinking vessel is less prone than a water bottle or drinks bottle of a similar size and shape to be inadvertently squeezed or dented, which would ordinarily increase the pressure of fluid within the drinking vessel. With this drinking vessel, the presence of the inner body 30 within the outer body 20 means that the outer body 20 is less able to be squeezed or dented by external force towards the longitudinal axis of the drinking vessel. As such, the accidental expelling of the contents of the drinking vessel through the aperture 14 is less likely. The resistance to squeezing of the drinking vessel is provided largely by the wall or piston face 7 that is at the top end of the inner body 30. However, the wall 6 of the inner body 30 contributes also to resisting against the squeezing of the outer body 20.

It will be appreciated that the drinking vessel can be stood on a surface, for instance a table, when full or part full of jelly without the jelly being expelled from the aperture 14. In particular, the vessel can be placed on the end 12 of the inner body 30, so that the drinking vessel is standing upright. Although this results in gravity applying a downwards force on the outer body 20 and the lid 40, relative movement between the outer body 20 and the inner body 30 is prevented by virtue of the screw thread fit between the components, and also in part due to the solid nature of the jelly included in the volume 11.

Figure 6A:
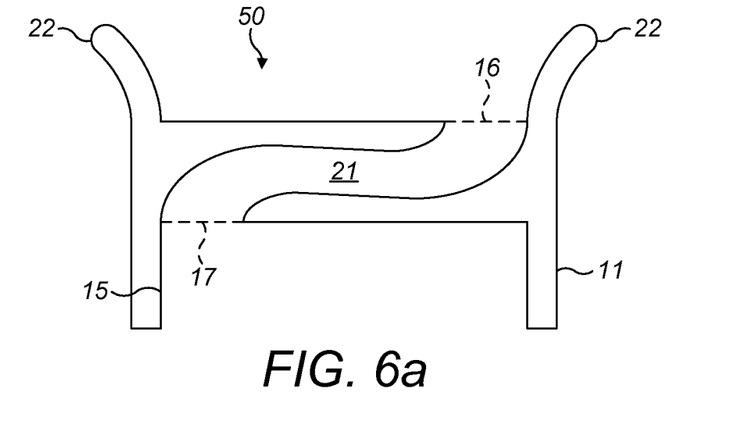
FIG. 6a is a side view of a second option for a lid of the drinking vessel in accordance with one embodiment of the invention.
Figure 6B:
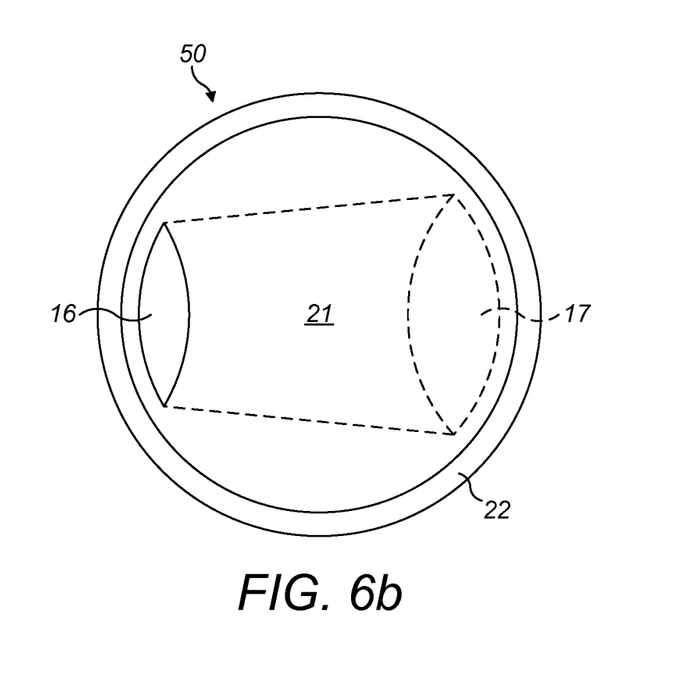
FIG. 6b is a front view of the lid in accordance with one embodiment of the invention.

An alternative lid is shown in FIGS. 6a and 6b. The lid 50 is able to replace the lid 40 on the uppermost end of the outer body 20. The lid 50 includes a tubular part 11 having an internal thread 15, in the same way as the lid 40 shown in FIGS. 4a and 4b.

However, the lid 50 is absent a spout. Instead, a channel extends internally within the lid 50 from a location adjacent to the aperture 10 of the outer body 20 to a mouth 16. A lip 22 is formed around the uppermost edge of the lid 50. The mouth 16 of the channel 21 exits the body of the lid 50 adjacent to the lip 22. The presence of the lip 22 makes it easy for the user to place the drinking vessel against their mouth in such a way that jelly dispensed from the volume 11 enters into their mouth. In particular, the lip 22 is curved generally outwardly from the axis of the drinking vessel such as to form a comfortable fit on top of a lower lip of the mouth of the user. As such, jelly that is expelled through the mouth 16 then passes over the lip 22 of the lid 50 and into the mouth of the user, similarly to the way in which liquid would pass from a glass or cup having an outwardly extending lip as the glass or cup is tipped upwards when the lip of the cup or glass was located on top of the lower lip of the user's mouth.

Instead of the mouth 16 of the channel 21 being adjacent the lip, the mouth of the channel 16 may be within the lip, for instance at the edge of the lip that extends furthest into the user's mouth. In this case, the outer shape of the lip may be uniform or it may have a different shape in the region of the mouth compared to other parts of the lip.

As can be seen from both FIGS. 6a and 6b, the channel 21 in the lid 50 is of a non-regular shape, and includes at least two bends. This contributes to causing breakup of the structure within the jelly as it is forced from the volume 11 through the aperture 10 and along the channel 21 to the mouth 16. This causes breakup (mastication) of the jelly, allowing it to be drunk by the user without requiring chewing or other breaking up of the structure of the jelly within the user's mouth. The effect is further enhanced by the fact that the area of the channel 21 at the mouth 16 is significantly lower than the area of the channel at the other end, which is adjacent the aperture 10 in the outer body 20. This causes the speed of flow of the jelly to increase as it passes along the channel 21, causing further breakup of the structure of the jelly as it passes along the channel 21.

Figure 7:
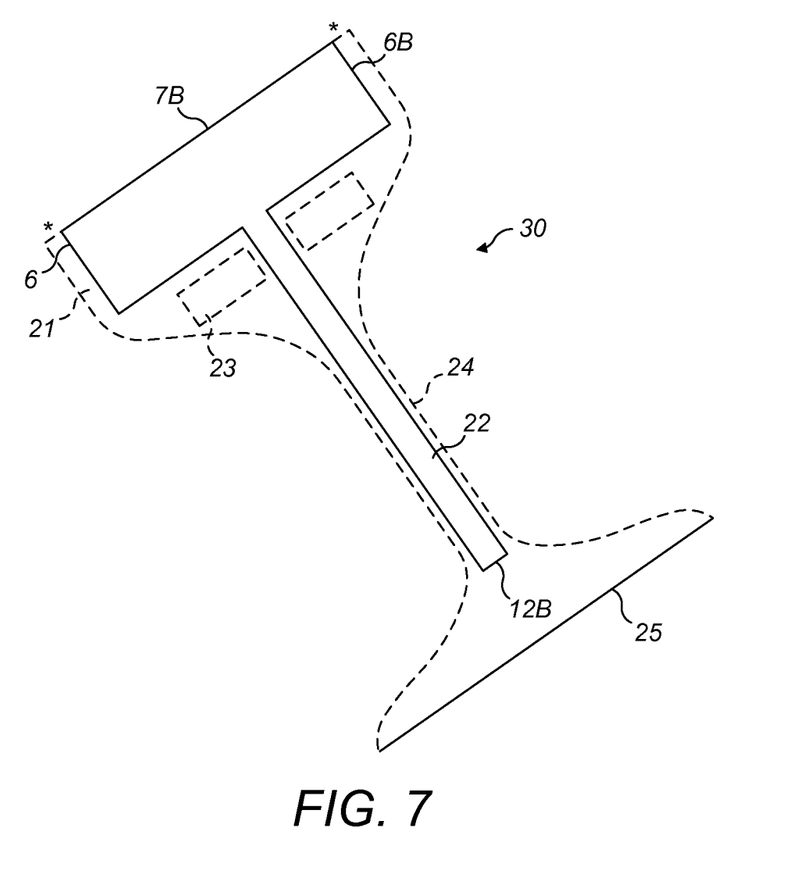
FIG. 7 is a cross-sectional view of an alternative inner body for the drinking vessel in accordance with one embodiment of the invention.

An alternative form for the inner body 30 is illustrated in FIG. 7. Here, a piston face 7b is provided on one end of a cylindrical component having a wall 6. A thread 6b is formed on the outer diameter of the cylindrical component. The thread 6b is similar to the thread 2 of the FIG. 2 embodiment. The cylindrical component is fitted, in the position shown in FIG. 7, within a main body part that includes a head 21, a stem 24 and a base 25. The head 21 mates with the lowermost end of the outer body 20 of FIG. 1, so as to cause the main body part to be secured in a fixed positional relationship with the outer body 20. Alignment of the components is shown by the asterisks in the Figures.

A shaft is connected at the opposite end of the cylindrical component, and extends along the longitudinal axis of the cylindrical component opposite the piston face 7b. An electrical motor and drive gearing arrangement is provided adjacent the shaft 22. The motor and drive gear 23 is operable to engage with a thread or cog feature that is formed on the outermost surface of the shaft 22. As such, rotation of the motor forming part of the motor and drive gear 23 causes the shaft to be rotated axially. The rotation translates into a helical movement of the cylindrical component along its longitudinal axis as the thread 6b meshes with the thread 5 of the outer body 20. The helical motion is similar to or the same as the helical motion experienced with the movement of the inner body 30 relative to the outer body 20 in the embodiment described with reference to FIGS. 1 to 5.

In use, the inner body 30 is located and attached onto the lowermost end of the outer body 20. The inner body 30 may be attached to the outer body 20 in any suitable way. Instead of the arrangement mentioned above, a thread arrangement externally at the location shown at 24 in FIG. 7 on the inner body 30 may engage with an internal thread on the outer body 20, such as the thread shown at 5 in FIG. 1. The inner body 30 may for example be screwed into the outer body 20 until a stop is reached, at which point the piston face 7b may be at the location shown by the dotted line 9 in FIG. 1.

As mentioned above, jelly in liquid form may be included in the outer body 20 to the level 9 when the outer body 20 is inverted from the position shown in FIG. 1.

Once the inner body 30 and the outer body 20 are secured to one another, the drinking vessel is ready for use. Instead of the user manually rotating the inner body 30 relative to the outer body 20, the user may cause the piston face 7b of the inner body 30 to provide a force against the jelly in the volume 11 and thus cause it to be expelled through the lid 40, 50 by operating a switch or other input device that causes electrical power to be provided to the motor and drive gear 23, and thus causes displacement of the shaft 22 helically along the longitudinal axis of the drinking vessel. The force exerted on the jelly in the volume 11 can result in the expelling of jelly through the lid in the same way as described with reference to the drinking vessel shown in FIG. 5. However, this can be achieved without requiring manual rotation by a user. However, it does utilize a threaded screw connection within the inner body and the outer body.

With the inner body 30 shown in FIG. 7, the drinking vessel may be placed in an upright position on a surface by placing the base 25 on the surface. Additionally, the stem 24 of the inner body 30 a handle 24 that extends around the shaft and allows the user to hold the drinking vessel in one hand. Manipulation of the switch or other user input may be effected using the same hand, or it may be effected by the other hand of the user.

Various alternatives will be apparent to the skilled person, and the invention is not limited by the specific embodiments described above. A number of alternatives will now be described.

Although in the above only a single aperture 10 is included in the end member 1 of the outer housing 20, it will be appreciate that instead there may be multiple apertures, or indeed the end member 1 may be omitted entirely. The use of one or more apertures in specific locations allows the provision of a channel in the lid that causes the structure of the jelly to be broken down or masticated as it is forced from the volume 11 within the outer body 20 to a location where it can enter the mouth of the user.

Additionally, although in the above the outer body 20 and the lid 40, 50 are described as being separate components that can be connected together, in other embodiments the outer body and the lid may be unitary.

A paste or gel typically has a lower water content than a jelly. The dispensing of a jelly may be more for the purpose of hydration and/or taste and/or the provision of a desired chemical, such as alcohol. However, a jelly can be configured to provide nutrition.

After all of the jelly has been dispensed, at which time the piston face 7 of the inner body 30 is located against the end member 1 of the outer body, the drinking vessel may be disassembled for reuse. Disassembly is performed by the user rotating the inner body 30 relative to the outer body in the opposite direction, for instance by rotating the inner body 30 in an anti-clockwise direction. After sufficient rotation, the inner body becomes removed from the outer body 20. The lid 40, 50 may also be removed.

After disassembly of the drinking vessel, some residual jelly may remain on the internal surfaces of the outer body 20, and may be included also on some surfaces of the outer body 30. The channel 19, 21 within the lid 40, 50 may remain filled with jelly. The jelly in the channel will have been masticated to some extent by the process of movement of the jelly into and along the channel. As such, removal of this jelly is relatively easy. Cleaning of the inner body 30 and the outer body 20 may be performed using a sponge, cloth or brush in the same way that cups, glasses etc. can be cleaned by a user washing them in soapy water. Alternatively, the components may be placed into a dishwasher, for automatic cleaning. In either case, the configuration of the drinking vessel is such that cleaning is relatively straightforward and effective.

The components of the drinking vessel, particularly the outer body 20, the inner body 30 and the lid 40, 50 may be formed of any suitable material. Plastics materials may be particularly suitable for the components, but glass, ceramics, metals etc. may be used instead.

In the case of a lid 40 including a spout 13, a soft plastic material may be used, so as to maximize the effectiveness of the spout.

Once the drinking vessel contains set jelly, it can be placed on its side on a surface such as a table, although the cylindrical nature of the outer body 20 is such that it may roll around on an uneven surface.

The screw fitting between the inner body 30 and the outer body 20 may cover the whole of the range of which the inner body 30 and the outer body 20 may be moved. Alternatively, the screw thread may be in respect of only part of this range, as long as the screw thread arrangement allows the user to control displacement of the inner body 30 within the outer body over all of the required range by screw action on the inner body 30 and the outer body 20.

The screw thread components of the inner body 30 and the outer body 20 may be provided with surface coating so as to provide lower levels of static and/or dynamic friction as the inner body 30 is screwed into and out of the outer body 20.

Providing a relatively tight screw thread fit between the inner body 30 and the outer body 20 may provide a good user experience, particularly if low-friction materials or coatings are used. However, having a relatively loose screw thread fit may make operation of the drinking vessel simpler by allowing some jelly from the volume 11 to enter into the screw thread arrangement and thereby lubricate it as jelly is expelled. Although this results in some wastage of the jelly, it is relatively little jelly that is wasted and it can allow the use of cheaper materials, reducing overall cost of the manufacture of the drinking vessel.

Figure 7B:
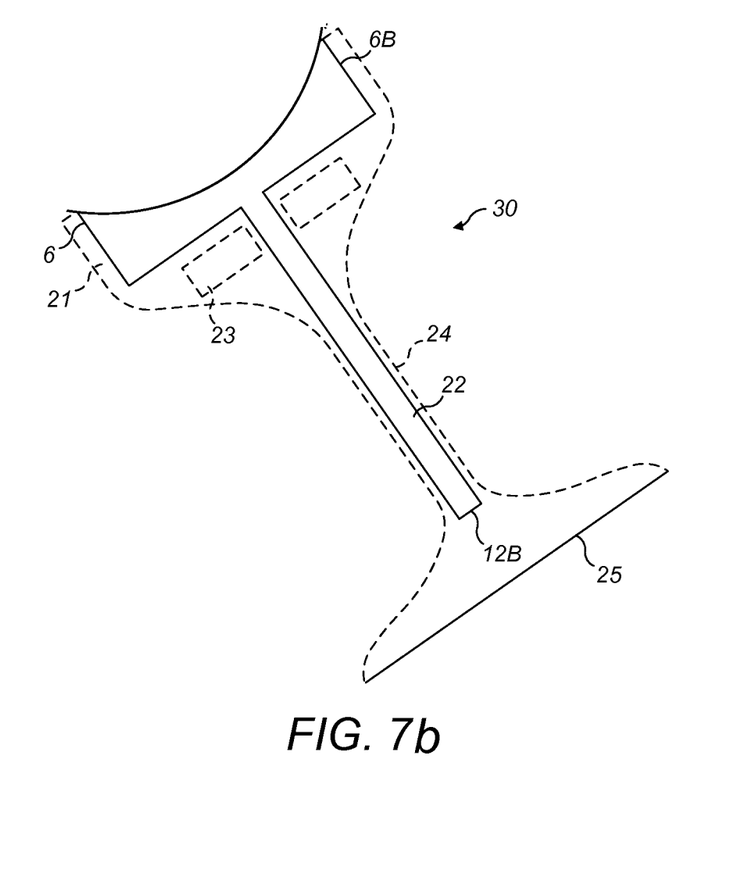
FIG. 7b is a cross-sectional view of an alternative inner body for the drinking vessel in accordance with one embodiment of the invention.

Instead of being planar, the piston face 7, 7B may be provided with features so that it is non-planar. The features can contribute to mastication of jelly close to the piston face 7, 7B as the inner body 30 is helically screwed into the main body to dispense jelly. A valley-shaped cross-section, such as a U-shape or a V-shape, shown in FIG. 7b, may also cause loosening of jelly and breaking of the bonds between the jelly and inner wall of the outer body 20 beyond the physical location of the inner body 30.

Although in the above embodiments it is the outer body 20 that includes the aperture 10 through which the jelly is dispensed to the user, it will be appreciated that instead the aperture could be provided in the inner body. However, the provision of the aperture 10 in the outer body provides a simpler arrangement, in particular that it allow the jelly to be dispensed to the user through a relatively unsophisticated mechanism.

Although in the above the outer body 20 has an internal thread that engages with an external thread on the inner body, the converse may be true. For instance, the outer body may be provided with an externally threaded rod that extends along the axis of the outer body and mates with an internally threaded hole in a corresponding location on the inner body 30.

The drinking vessel can be made of a plastics material of reasonable rigidity, allowing it to be reused. However, a disposable drinking vessel can be provided with a similar structure but using lower cost materials, or using less of the same material. Disposable drinking vessels may be particularly interesting in relation to the containing and dispensing of alcoholic beverages as jellies.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A method comprising:
receiving a temporary lid over a first end of a generally cylindrical body part of a dispenser, wherein the generally cylindrical body part has an opening at a second end thereof for receiving a dispensing member;
while the temporary lid is in place, receiving jelly mixture in the generally cylindrical body part of the dispenser, the liquid jelly mixture designed to be refrigerated in the generally cylindrical body part such that the jelly mixture sets to form a set jelly;
receiving, at the first end of the generally cylindrical body and after the jelly mixture has set to form the set jelly, a dispensing lid in place of the temporary lid, the dispensing lid having a dispensing channel for dispensing the set jelly to a user, wherein the channel is at least one of: tapered, and including one or more bends; and
receiving, at the second end of the generally cylindrical body, the dispensing member;
wherein the generally cylindrical body part has a thread and wherein the dispensing member has a thread that mates with the thread of the generally cylindrical body part so as to cause movement of the dispensing member helically within the body part as the dispensing member is rotated relative to the body part, thereby to provide dispensing of the set jelly through the channel of the dispensing lid.

2. The method of claim 1, wherein the dispensing member has a face that extends across the longitudinal axis of the generally cylindrical body part in use and is configured to exert an expelling force against the jelly as the dispensing member moves helically within the generally cylindrical body part.

3. The method of claim 2, wherein the face of the dispensing member is substantially planar.

4. The method of claim 2, wherein the face of the dispensing member is non-planar.

5. The method of claim 2, wherein the face of the dispensing member has a valley shaped cross section.

6. The method of claim 1, further comprising:
allowing a user to rotate the dispensing member relative to the generally cylindrical body part using a grip in the dispensing member.

7. The method of claim 1, wherein the dispensing member is configured to move helically within the body part by a transducer.

8. The method of claim 7, wherein the transducer is a motor.

9. A dispenser comprising:
a generally cylindrical body part having a thread and having first and second ends;
a temporary lid receivable at the first end of the generally cylindrical body part to contain jelly mixture in the generally cylindrical body part of the dispenser as the jelly mixture sets to form a set jelly;
a dispensing lid receivable at the first end of the generally cylindrical body part in place of the temporary lid, the dispensing lid having formed therein a channel for dispensing the set jelly to a user, the channel being at least one of: tapered, and including one or more bends; and
a dispensing member receivable in an opening at the second end of the generally cylindrical body part, the dispensing member having a thread that mates with the thread of the generally cylindrical body part so as to cause the movement of the dispensing member helically within the generally cylindrical body part as the dispensing member is rotated relative to the generally cylindrical body part, to provide the dispensing of the set jelly through the channel of the dispensing lid.

10. The dispenser of claim 9:
wherein the dispensing member has a face that extends across the longitudinal axis of the generally cylindrical body part in use and is configured to exert an expelling force against the jelly as the dispensing member moves helically within the generally cylindrical body part.

11. The dispenser of claim 10, wherein the face of the dispensing member is substantially planar.

12. The dispenser of claim 10, wherein the face of the dispensing member is non-planar.

13. The dispenser of claim 10, wherein the face of the dispensing member has a valley shaped cross section.

14. The dispenser of claim 9, further comprising:
a grip in the dispensing member for allowing a user to rotate the dispensing member relative to the generally cylindrical body part.

15. The dispenser of claim 9, wherein the dispensing member is configured to move helically within the body part by a transducer.

16. The dispenser of claim 15, wherein the transducer is a motor.

17. The dispenser of claim 9, wherein the channel is tapered.

18. The dispense of claim 9, wherein the channel includes one or more bends.

* * * * *